3,153,602
TREATMENT OF VESSELS USED FOR HOLDING
MOLTEN ALUMINUM METAL
Richard Gerald Duckett, Birmingham, England, assignor to Foseco International Limited, Nechells, England, a British company
No Drawing. Filed July 5, 1962, Ser. No. 207,787
Claims priority, application Great Britain, July 11, 1961, 25,126/61
5 Claims. (Cl. 134—5)

This invention relates to a method of treating vessels which are adopted to hold molten metal and is more particularly concerned with a method of treating such vessels which have contained molten metal and which are still contaminated thereby, to render them fit for further use.

It will be understood that when a vessel has been used for holding molten metal and the molten metal is tapped away from the vessel, a proportion of molten metal remains behind, for example, as a coating on the walls of the vessel, or it may be to some extent impregnated into the surface of the interior walls of the vessel. This arises particularly in the case of furnaces, such as reverberatory furnaces, which are used for melting metal, to ladles and to vessels which are used for holding molten metal, e.g. as a preliminary to a casting operation.

If it is required to use a particular vessel of any of the foregoing types for handling in succession metals of different composition it is frequently essential that the vessel should be quite thoroughly cleaned of the residue of the first metal before the second metal is placed in it.

Thus, for example, an illustrative procedure in handling molten metal may be as follows. An aluminum alloy is melted in a reverberatory furnace. The molten alloy is tapped into one or more ladles and, at that stage, may be subjected to treatment, such as degassing treatments or to treatment to refine the grain of the metal. It may then be transferred from the ladles to a holding vessel maintained thermostatically at a suitable temperature at which the metal may be cast. The metal may then be cast by tapping from the holding vessel into ingot or casting molds.

In such a case, if it is required to change from the use of one aluminum alloy to another of different constitution it is important that the various vessels be cleaned free of the first alloy before the second is supplied to them, since otherwise contamination from the first used metal may cause some undesirable variation in the chemical constitution of the second metal submitted to treatment.

The method commonly employed, therefore, is to add to the first vessel of the series a quantity of aluminum metal of a high state of purity, so-called prime aluminum. This is melted in the furnace with some agitation so that it washes over the walls of the furnace, tapped into the ladles, where it is again agitated to ensure good contact with the walls, transferred from the ladles into the holding furnace or vessel, agitated in that vessel, and then tapped out to ingot or billet molds.

Whilst this method is effective, it is effective only because the prime aluminum picks up the residual metal and impurities from the various vessels as it passes through them and, in consequence, the final aluminum ingots obtained are no longer prime aluminum but aluminum of lower quality. This aluminum may of course be reused, after analysis, in the production of further aluminum alloys but, in itself, it is of lower value than the prime aluminum from which it was obtained.

Further, the aforesaid process requires that the furnace, ladle and other vessels are used for non-productive work, or cannot be used in production, for a lengthy period, so that overhead expenses are increased. Again the contaminated billet produced has to be cut into pieces to be re-melted and the machine shop is thus required to do considerable undesirable non-productive work.

The method, therefore, is of considerable practical difficulty and leads to an economic loss in terms of deterioration of a substantial amount of expensive prime aluminum.

It is an object of the present invention to provide a method for cleaning vessels as aforesaid which avoids the use of prime aluminum and present an important economic advantage.

According to the present invention there is provided a process for treating a vessel which has contained molten metal and which is still contaminated as a result thereof, to render it fit for use in holding molten metal of different alloy composition, which comprises spraying the inner surface of the vessel with a powdered salt flux, causing the powder to melt in contact with the contaminated inner surface of the vessel, allowing the molten salt flux to remain in situ with such surface for a standing period and thereafter removing the spent molten salt flux and entrained contaminates from the vessel.

The molten salt flux may be of a constitution selected having regard to the particular type of metal which it is required to remove from the vessels under treatment. In general, it will consist of mixtures of halide salts, e.g. sodium and potassium chlorides, fluorides and the like.

The flux, as indicated, is employed in powder form and is introduced into the vessels by spraying it from any suitable type of powder spray gun. In this way it can be ensured that the powder covers the contaminated walls of the vessel, and if the vessel is at a sufficiently high temperature at the time of treatment, the powder will fuse on contact with the walls. The furnace heat is turned on for a short period after introduction of the flux and the furnace then allowed to stand. The vessels as thus treated are allowed to stand for a period of time, e.g. 15 to 20 minutes.

Any molten flux adherent to the walls is then drained away from the vessel, the walls and hearth being scraped with the conventional cleaning tools, and it will be found that the flux has entrained in it the greater part of any residual metal which was present on, or occluded in, the surface of the walls of the vessel under treatment. The effluent flux thus obtained may, if desired, be subjected to further treatment to recover from it the metal values.

It appears that the efficacy of the molten salt flux treatment of the present invention derives from the fact that the molten metal, slag and other contaminants of the walls of the vessel tend to lie on those walls in laminae and the salt flux appears to have the property of entering between the laminae and then slowly into the surface of the walls of the vessel so that it absorbs such residual metal as may be present.

It is also to be noted that in addition to contamination by the metal which has previously been in the vessel under treatment the walls are often contaminated with metal oxides and these are equally removed by the aforesaid flux treatment.

The method of the invention thus presents a most important economic advantage. Not only does it substitute for expensive prime aluminum a quantity of relatively inexpensive salt flux, but the whole operation is carried out in a much shorter space of time and the effluent residue does not represent in itself an important economic loss. In this connection, it may be noted that by using the older method of applying prime aluminum as much as 4 tons of aluminum may be necessary to clean out a ten-ton melting furnace and it is in connection with such metal melting furnaces that the present invention possesses its greatest economic advantage. The following example will serve to illustrate the invention:

*Example*

A seven-ton capacity reverberatory furnace was used to melt an aluminum-copper-magnesum-silicon-manganese alloy. When pouring the molten metal from the furnace as much care was taken as possible to ensure that the minimum quantity of molten metal was left behind in the furnace. The furnace heat was turned off and the furnace walls were then treated with a powdered salt flux consisting of fluorides, chlorides, carbonates, nitrates of the alkali and alkaline earth metals along with other desirable additions such as metal powders in semi-colloidal form, adhesives, amorphous carbon etc.

The powder was sprayed over the total surface area of the walls and hearth of the furnace as uniformly as possible by means of a compressed air operated spray gun working at approximately five atmospheres pressure. The total amount of powdered salt flux used was approximately 80 lbs.

The furnace was then reheated at full pressure for 15 minutes. The furnace walls were then cleaned down using a scraping tool similar in shape to a Dutch hoe. The dross on the furnace hearth was rabbled vigorously and the recovered metal was transferred into a ladle. The average amount of metal recovered in a series of ten tests was found to be about 200 lbs.

At this stage the residual dross and metal which had drained off the furnace lining was all tapped away thus leaving a clean surface and the furnace was then charged with an alloy of aluminum-silicon. This metal was melted and tapped in the usual way. On analysis it was found that it had not significantly changed in composition due to any pick-up of residual metal in the furnace.

In a modification of the process of this invention the operation of spraying the interior walls of the furnace with a powdered salt flux mixture may be carried out while metal is still in the furnace, i.e. in the course of the first tapping operation. It is found in this way that the metal is entrained by the flux from the walls of the furnace so that as the level of metal in the furnace falls on tapping, the flux salt mixture with entrained metal falls with it, and in this way the cleaning of the vessel may be further facilitated.

Any of the usual fluxes that are known for use as a liquid cover for molten alloys are suitable for the present invention but of particular value are the ternary salt mixtures comprising sodium and potassium chlorides and a fluoride (e.g. sodium fluoride or cryolite). A useful range of proportions for such fluxes is:

| | Parts by weight |
|---|---|
| Sodium chloride | 30-50 |
| Potassum chloride | 25-50 |
| Fluoride | 20-40 |

A specific mixture which has been found to be particularly suitable where the metal residues are aluminum or aluminum alloy consists of:

| | Parts by weight |
|---|---|
| Sodium chloride | 40 |
| Potassium chloride | 35 |
| Cryolite | 25 |

I claim as my invention:

1. A process for removing adherent residue from an empty vessel which has contained molten aluminum alloy, the adherent residue comprising small quantities of the aluminum previously contained together with the metal oxides, slag, or other contaminants, to prevent contamination of subsequent charges of molten aluminum alloy, which comprises (*a*), spraying the inner surface of the vessel with a powdered salt flux comprising salts selected from the group consisting of the fluorides, chlorides, carbonates, and nitrates of the alkali and alkaline earth metals, (*b*) causing the powdered salt flux to melt in contact with the inner surface of the vessel, (*c*) allowing the molten salt flux to remain in situ with each surface for a standing period, and (*d*) thereafter removing the spent salt flux and entrained aluminum from the vessel.

2. A process according to claim 1 wherein the vessel is at a temperature sufficiently high to cause the applied flux to melt on contact therewith and the treated vessel is allowed to stand for 15 to 20 minutes before removing the flux therefrom.

3. A process according to claim 1 wherein the flux comprises a powdered mixture of sodium and potassium chlorides and a fluoride.

4. A process according to claim 1 wherein the flux comprises 30–50 parts by weight of sodium chloride, 30 to 50 parts by weight of potassium chloride and 20 to 40 parts by weight of a fluoride.

5. A process for removing adherent residue from an empty vessel which has contained molten aluminum alloy, the adherent residue comprising small quantities of the aluminum previously contained together with the metal oxides, slag, or other contaminants, to prevent contamination of subsequent charges of molten aluminum alloy, which comprises (*a*) spraying the inner surface of the vessel with a powdered salt flux comprising about 40 parts by weight of sodium chloride, about 35 parts by weight of potassium chloride, and about 25 parts by weight of cryolite, (*b*) causing the powder to melt in contact with the inner surface of the vessel, (*c*) allowing the molten salt flux to remain in situ with such surface for a standing period, and (*d*) thereafter removing the spent molten salt flux and entrained aluminum from the vessel.

References Cited in the file of this patent

UNITED STATES PATENTS

| 1,950,967 | Bonsack | Mar. 13, 1934 |
|---|---|---|
| 2,107,282 | Beck | Feb. 8, 1938 |
| 2,170,863 | Junker et al. | Aug. 29, 1939 |
| 2,372,563 | Emley | Mar. 27, 1945 |
| 2,380,284 | Young | July 10, 1945 |
| 2,474,674 | Holden | June 28, 1949 |
| 2,481,591 | Heilman et al. | Sept. 13, 1949 |
| 2,535,536 | Hagmaier | Dec. 26, 1950 |
| 2,848,321 | Banbury et al. | Aug. 19, 1958 |
| 2,987,391 | Foster et al. | June 6, 1961 |
| 3,043,678 | Lowry et al. | July 10, 1962 |

FOREIGN PATENTS

| 520,533 | Great Britain | Apr. 26, 1940 |